US006506315B2

(12) United States Patent

Ferro

(10) Patent No.: US 6,506,315 B2

(45) Date of Patent: Jan. 14, 2003

(54) METHOD OF REPRODUCING COLORED IMAGES ON A HEAT TRANSFERABLE DECORATIVE, AT LEAST PARTIALLY METALLIZED AND/OR 2 D OR 3 D HOLOGRAPHIC FILM

(75) Inventor: Mario Ferro, Bastia di Rovolon (IT)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/990,269

(22) Filed: Nov. 23, 2001

(65) Prior Publication Data

US 2002/0084246 A1 Jul. 4, 2002

Related U.S. Application Data

(63) Continuation-in-part of application No. 09/469,503, filed on Dec. 22, 1999.

(30) Foreign Application Priority Data

Dec. 23, 1998 (IT) ........................................ MI98A2819

(51) Int. Cl.[7] ................................................. G03H 1/00

(52) U.S. Cl. .......................... 216/100; 216/11; 216/28; 216/32; 216/43; 283/901; 283/902; 430/1; 430/2

(58) Field of Search ............................... 216/11, 28, 32, 216/33, 37, 41, 43, 100; 283/95, 96, 97, 901, 902; 430/1, 2

(56) References Cited

U.S. PATENT DOCUMENTS

| | | | | | |
|---|---|---|---|---|---|
| 4,512,848 | A | * | 4/1985 | Deckman et al. | 204/192.32 |
| 4,604,329 | A | * | 8/1986 | Reber | 216/2 |
| 4,634,148 | A | | 1/1987 | Greene | |
| 4,971,646 | A | | 11/1990 | Schell et al. | |
| 5,190,318 | A | | 3/1993 | Mantegazza | |
| 5,234,537 | A | * | 8/1993 | Nagano et al. | 216/67 |
| 5,267,753 | A | | 12/1993 | Chock | |
| 5,509,553 | A | * | 4/1996 | Hunter et al. | 216/13 |
| 5,509,692 | A | | 4/1996 | Oz | |
| 5,636,874 | A | | 6/1997 | Singer | |
| 5,660,738 | A | * | 8/1997 | Hunter et al. | 216/17 |

FOREIGN PATENT DOCUMENTS

| | | |
|---|---|---|
| JP | 04 303881 | 10/1992 |
| WO | WO 97 34170 | 8/1997 |

* cited by examiner

*Primary Examiner*—Randy Gulakowski
*Assistant Examiner*—Jiri Smetana
(74) *Attorney, Agent, or Firm*—Lowe Hauptman Gilman & Berner, LLP

(57) ABSTRACT

A method of producing indicia on a metallized and/or a holographic film comprising the steps of (a) printing, on an etchable surface of the film, a co-polymeric primer in a predetermined pattern, (b) depositing an activated etching substance on top of at least the unprinted metallized and/or holographic material under conditions sufficient to etch away portions of the film not covered by the primer and thereby forming a crystallized material as the debris of etching, (c) removing the crystallized material formed during etching and also removing any excess etching substance, and (e) drying the etched, printed film. Optionally, a reinforcing film layer may be disposed over the etched surface. The reinforcing layer may be colored in a predetermined pattern, especially a pattern that corresponds to the pattern of printing of the non-etchable copolymer.

19 Claims, 2 Drawing Sheets

METHOD OF REPRODUCING COLORED IMAGES ON A HEAT TRANSFERABLE DECORATIVE, AT LEAST PARTIALLY METALLIZED AND/OR 2 D OR 3 D HOLOGRAPHIC FILM

This application is a continuation in part of application Ser. No. 09/469,503 filed Dec. 22, 1999.

BACKGROUND OF THE INVENTION

The present invention relates to a method of reproducing indicia, that is image or text or characters on a film that is at least partially metallized and/or is holographic. It more particularly refers to a method of selectively removing portions of the metalized and/or holographic film in a predetermined pattern corresponding to the indicia sought to be printed.

There is a need to provide indicia (image or text) printed in a metallized and/or 2D or 3D holographic pattern on heat transferable films. In particular there is a need to provide such indicia with high definition and low costs.

The printed indicia must have sharp edges and be as small as 1 mm. It is preferred that the printed indicia be protected from being damaged, changed or otherwise adversely affected by subsequent manufacturing steps, such as overprinting at least some of the indicia with polymeric colors and depositing the indicia on an heat transferable layer. It is also preferred that the indicia be easily transferable to a carrier to form a final product. The transfer can be accomplished by the well known hot transferring method.

Currently, there is no existing method that could adequately meet the above stated requirements.

OBJECTS OF AND BRIEF SUMMARY OF THE INVENTION

Therefore, an object of the present invention is to provide a method of reproducing high-definition indicia, such as image or text or characters, on a 2D or 3D holographic and/or metallized film.

Another object of the present invention is to provide a method of reproducing indicia on a 2D or 3D holographic and/or metallized film where the reproduced image or text has a size greater than or equal to about 1 mm.

A further object of the present invention is to provide a method of reproducing indicia on a 2D or 3D holographic film that is specifically designed to provide protection of the indicia during subsequent manufacturing processes.

A still further object of the present invention is to provide a method of reproducing indicia on a 2D or 3D holographic and/or metallized film that allows the reproduced material to be easily transferred to various types of pre-formed plastic carriers.

Other and additional objects will become apparent from a consideration of this entire specification as well as the claims appended hereto.

The above-mentioned objects are achieved by a method of reproducing indicia, such as images or text, on a metallized and/or holographic film, that comprises the steps of:

(a) printing a co-polymeric primer, in a predetermined pattern corresponding to a positive of indicia sought to be applied to the metallized and/or holographic film, on a preformed metallized and/or holographic film, wherein the primer is resistant to etching, (b) bringing an activated etching substance into effective contact with the unprimed portions of the surface of the holographic film and/or the metal layer, and possibly also into contact with the relatively inert primer coating as well, (c) subjecting the primer coated holographic and/or metallized film to etching conditions, whereby causing portions of the holographic and/or metallized film not covered by the primer to be etched away, and thereby forming a crystallized debris material disposed on a substrate that was, before etching, disposed under said metallized or a portion of the holographic film that is below that portion of the holographic film that was etched away, (d) removing the so formed crystallized debris material, and (e) drying the resultant multilayer etched film.

In a preferred subsequent step, the etched, washed and dried multilayer film has a further polymeric layer disposed over both the surface remaining after the etching has been accomplished and the unetched primer surface. The top polymeric layer provides additional protection of the etched surface against later damage or distortion that may be caused by subsequent processing or use. The top polymeric layer may also provide a decorative effect by applying color to all or part of the surfaces of the multilayer film. The color is preferably, but not necessarily exclusively, applied to the portion of the top polymer layer that only covers the unetched primer. Different color polymer top layers can be provided as desired. It is within the scope of this invention to apply the polymer top coating as a plurality of layers of different, of the same, or different, colors disposed in predetermined patterns(s).

For ease of understanding and description, the layer of the metallized and/or holographic film that will be later subjected to etching according to the practice of this invention will hereinafter be referred to as the etch layer.

In accordance with the present invention, the metal layer may be laminated to a holographic film, and the combination laminated to a supporting substrate film. Alternatively, the holographic film, without a superposed metallic layer, may be laminated to a supporting under-film. Further alternatively, the metal may be deposited on the holographic substrate in any of the many conventional processes that are known for this purpose. These laminations may be accomplished by the action of heat, pressure or through an adhesive that had been previously coated on the substrate or on the surface of the metal or holographic film that will be juxtaposed to the substrate. Lamination should be prior to the printing step.

The removal of the crystallized debris material is preferably performed in a plurality of stages using demineralized water. Each washing is followed by draining the wash water and accompanying debris for as many times as it takes to remove substantially all of the debris.

The drying step is preferably conducted in a hot bed air system. After the crystallized material has been removed, the film is preferably printed using polymeric colors in such a manner as to form together with the indicia, previously obtained by means of the etching procedure, a complex image or text or the like.

BRIEF DESCRIPTION OF THE DRAWINGS

The present invention is illustrated by way of example, and not by limitation, in the figures of the accompanying drawings, wherein elements having the same reference numeral designations represent like elements throughout.

Each of FIGS. 1–6 are schematic views showing the steps of a method of printing on a metallized holographic film, in accordance with an embodiment of the present invention. Each of these schematic view is represented as a cross section for ease of understanding.

DETAILED DESCRIPTION OF THE INVENTION

Further details and advantages, as well as important features, of the present invention will become more apparent from the following detailed description of exemplary embodiments of the inventive method.

The inventive method allows the reproduction of indicia, such as: images, text, logos, characters, etc., on a preformed metallized and/or holographic film. The holographic film substrate may be of any desired color, or it may be comprised of a plurality of colors as desired. The holographic film may have 2D or 3D patterns. A uniformly metallized and/or holographic film is not, per se an invention. In the following description, a commercially available metallized holographic film is used as exemplary of the films that can be employed in this invention. However, any other suitable holographic material, having an etchable surface could be used instead of a metallized holographic film as will be readily contemplated by those of ordinary skill in the art.

Figure 1:
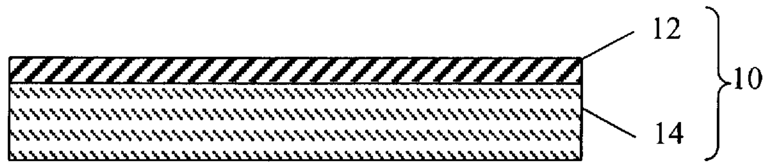

The instant inventive method moreover allows for easy removal, by etching, of selected portions, of either the metal layer or an otherwise etchable portion of the holographic film, from the holographic film to obtain a pattern or patterns corresponding to the positive of the indicia (images, text or characters) to be reproduced. As can be seen in FIG. 1, a starting material for one aspect of the instant inventive process is a metallized holographic film 10 that is preferably of a type that is commercially available in the market. The holographic film 10 comprises a metal layer 12, that is preferably as thin as possible, and a supporting plastic layer 14. The purpose of the supporting layer 14 is to strengthen the very thin metal layer 12. Suitably, the metal layer is about 1 to 3 microns in thickness. Preferably, the supporting layer 14 is significantly thicker than the metal layer 12, as illustrated in the drawing. The supporting layer 14 in commercially available films is suitably about 15 to about 22 microns in thickness, preferably about 19 microns in thickness according to a preferred embodiment of the invention. The supporting layer 14 is preferably made of polyester, although other suitable materials may be used.

Figure 2:

In a laminating step, the results of which are depicted in FIG. 2, the holographic film 10 is coupled to a supporting substrate film 16 which is, preferably, also made of polyester. The purpose of the substrate film 16 is to further strengthen the holographic film 10, i.e. giving the holographic film 10 enhanced mechanical strength sufficient to withstand further processing steps. The substrate film 16 and holographic film 10 may be laminated together by a number of different techniques, e.g. by heat bonding or by utilizing an adhesive layer 18 interposed therebetween. In a preferred embodiment, the adhesive layer 18 has previously been conventionally applied on a surface of the substrate film 16 by a spreading process, such as through the use of a doctor blade. Then, the surface of the substrate film 16, carrying thereon the spread adhesive layer 18, is placed against the surface of the supporting layer 14 of the holographic film 10 that is opposite to the holographic film surface that will be later etched. The resulting sandwich-like structure is subjected to bonding conditions that are suited to the specific adhesive and films that are being employed. The bonding adhesive and process are per se well known in the plastic film laminating art. One such method utilizes thermal activation of the adhesive in order to allow the adhesive material 18 to evenly distribute and adhere the holographic film 10 and substrate film 16 together in a stable condition. This is sometimes referred to as hot melt adhesion. Preferably, the substrate film 16 is made of polyester and is about 36 microns thick. It is within the scope of this invention to omit the step of laminating the substrate film 16 to the holographic film 10 if the holographic film 10, comprising the supporting layer 14, is strong enough to withstand any mechanical impact that it may be subject to during further processing steps.

Figure 3:
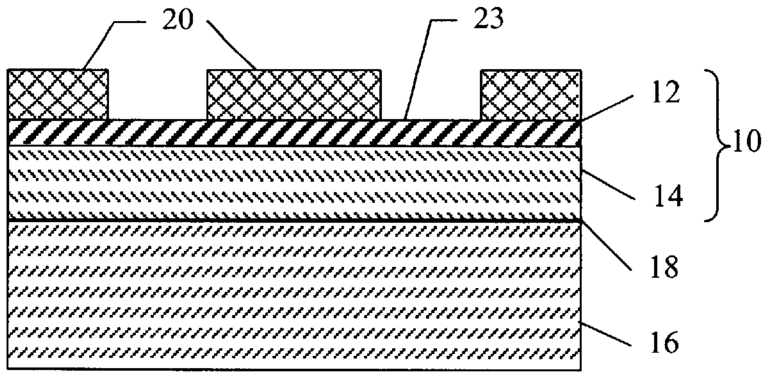

In the next step, shown schematically in FIG. 3, an etching resistant material 20 is printed/coated on an etchable surface of the laminated structure, for example on an upper surface of the metallized holographic layer 12, as shown in FIG. 3. The etching resistant material 20 is printed/deposited on the metallized surface in a predetermined pattern corresponding to the positive of the metallized and/or holographic indicia (text and/or image and/or character) to be printed on the final product (heat transferable decorative film). Although it has been indicated that the etch resistant layer is printed as a positive of the desired indicia, it is within the scope of this invention to reverse print the etchable surface of the holographic film and make the printed etch resistant layer a negative structure. In a preferred embodiment, the etching resistant material 20 is a co-polymer of vinyl chloride and -vinyl acetate that is deposited in a thickness that corresponds to a coating weight of about 10 to 35 gr/m$^2$, preferably about 28 gr/m$^2$. The etching resistant material 20 so deposited forms a mask that prevents portions of the metal holographic layer 12 from being etched away in the subsequent etching step. The remaining portions of the metal holographic layer 12, that are not covered by the etching resistant material 20, remain exposed through intentionally permitted gaps in the printed etch resistant film.

Figure 4:
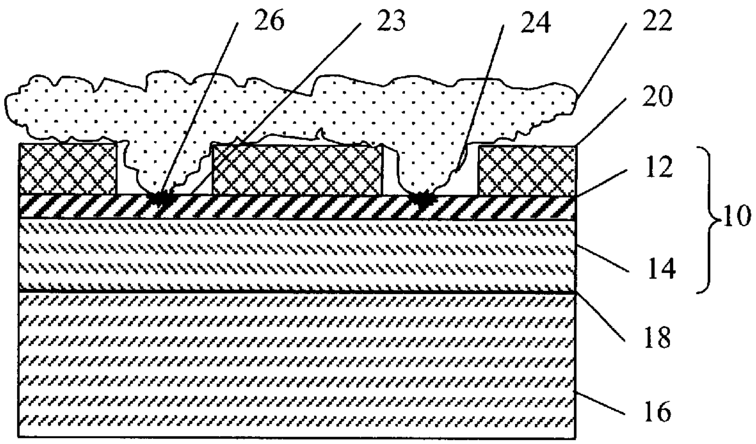

Next, an etchant 22, comprising a basic material that has the ability to etch the metal of the metallized holographic film, is deposited at least on the uncovered regions 23 of the metal portion of the holographic layer 12, as shown in FIG. 4. It is considered to be within the scope of this invention to apply etchant over the entirety of the metallized film even though the etchant will have substantially no effect on the primer coating. The etchant 22 is specifically chosen so as to have no substantial effect on the etching resistant primer material 20. However, the metal holographic layer 12, namely the uncovered regions of the metallized holographic film, are attacked and removed by the etchant 22. The etching effect of the etchant 22 is limited to within areas 24 that have side walls that are normal to an outer edge of the printed etching resistant primer material 20, and a bottom that is limited and defined by the supporting layer 14. Thus the etching material 22, the primer material 20 and the supporting substrate material 14 must be chosen so that they do not interact with each other. The supporting substrate 14 and the printed primer material 20 must be selected to be resistant to the etchant 22.

Preferably, the etching substance 22 is a material having high viscosity. In a preferred embodiment, the etchant 22 comprises sodium hydroxide in an aqueous sodium chloride solution. The proportion of sodium hydroxide in the etchant composition 22 is suitably about 10 to 35% by weight of the entire solution, preferably about 28% by weight. The sodium chloride solution is preferably an aqueous solution containing about 99% by weight of sodium chloride. In a preferred aspect of this invention, the etchant 22 also has an activating amount of at least one carboxylic acid, that is preferably a fatty acid, and isopropenyl acetate added to it before it is applied to the masked holographic structure shown in FIG. 4. The activated etchant 22 may be diluted in a 1–4 N mixture of methylpyrrolidone and methylbutyrolactone.

The etchant is preferably applied to the etchable surface of the metallized holographic film at a deposition rate of about 11.4 gr/$m^2$ at about 40° C. under a forced air flow. The etching step causes a crystallized material 26, comprising the etched remains of the metallizing film 12, to be formed. At least a portion of this debris 26 remains at the bottom of channels 24. This debris is suitably removed by multiple washing steps.

Of particular note, the metallized holographic layer 10 usually has two major surfaces only one of which contains holographic grooves. In the examples described herein, the major surface containing the holographic grooves is defined as facing upward. In other words, it is the upper surface of the holographic layer 10 that contains the holographic grooves and is metallized 12, and it is portions of this surface that are selectively removed by the etchant 22. However, other arrangements are not excluded.

Moreover, it has been noted that, though any etching agent may contain the etching substance, a basic agent, such as sodium hydroxide, is preferred. In fact, comparative tests carried out by the applicants using other etching agents have shown that, with the preferred etchant of this invention, the printing definition obtained is better.

Figure 5:
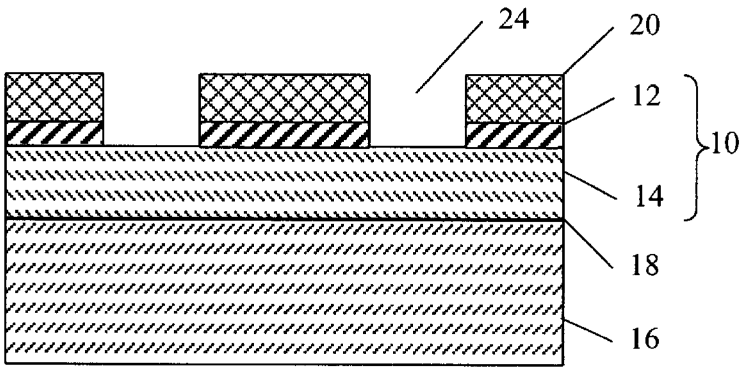

As shown in FIG. 5, the etched sites at the bottom of channels 24 have been washed to remove the crystallized debris material 26 therefrom. This operation also removes any excess amount of the etchant 22 that remained in the channels 24. The bottoms of the channels 24, that are disposed on the upper surface of the multiple film structure in a predetermined pattern, as defined by the previously deposited etching resistant primer material 20, is clean after the washing step. This washing step is preferably conducted in a spreading removal system that uses demineralized water, and it is preferably carried out by stages with intermediate decantation and removal of the washing fluid.

Figure 6:
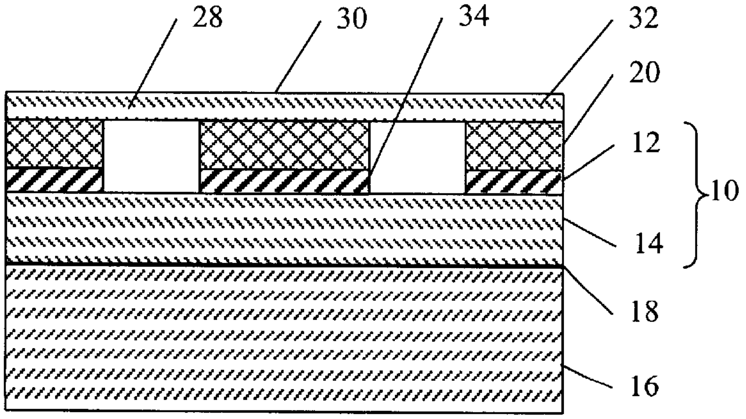

In a subsequent step, that is included in the schematic of FIG. 5, the multiple layer film structure is optionally dried. In the schematic of FIG. 6, the structure is shown to be reinforced by the addition of a top layer of polymeric film over at least the lands of primer material. In a preferred embodiment, the structure is first forcibly dried, such as for example through the use of a hot bed air system, at about 45° C. Then, a reinforcing processing is performed through the addition of an overlay that may or may not be colored.

One suitable reinforcing overlayer 28 as shown in FIG. 6 is a copolymer of vinyl chloride and vinyl acetate. A preferred rate of deposition of this protective reinforcing layer 28 is for example about 28 gr/$m^2$. The overlayer is disposed on top of the dried multiple layer film structure of this invention. The vinyl chloride-vinyl acetate copolymer may be preformed as a laminating film, or it may be formed in situ by depositing component monomers and/or short chain oligomers/polymers, i.e. vinyl chloride and vinyl acetate monomers, in a predetermined ratio on top of the multiple layer film structure. Then, the polymerization of the deposited monomers and/or short chain oligomers or polymers is catalyzed to facilitate polymerization thereof. The vinyl chloride-vinyl acetate copolymer layer, that has been formed in the above described manner or has previously been produced as a self supporting film, is then hardened by thermal treatment, preferably at about 45° C.

It is preferred that the resulting product have a substantially flat upper surface, that is the surface of the reinforcing vinyl chloride-vinyl acetate copolymer overlayer, as shown at 30 in FIG. 6. This structure facilitates transfer of the multiple layer film structure, including the metal holographic layer 12 and the printed indicia (image/text/character), to a carrier (not shown) in a subsequent step, without creating bubbles at the interface between the carrier and the multiple layer film structure. As a result, a superior clear view in and through the final product will be obtained.

The purpose of the layer of reinforcing material 28 is to obtain a flat upper surface 30, simultaneously to further strengthen the etched metal holographic layer 12, and to protect the same from being inadvertently scratched during subsequent processing steps.

After this step, a final printing step can be carried out on the upper flat surface using ordinary colored polymeric materials that are deposited according to predetermined patterns in known manner (e.g. by percolating the colors diluted in a thixotropic carrier through the meshes of a polyester fabric supported by a rigid frame. According to one aspect of this process some of the meshes will have been previously masked, such as by means of printing, according to the image of the pattern to be obtained in color, a substance impervious to the thixotropic color solution on the fabric.

In such a manner, complex, final printed indicia may be obtained upon the film that is partly formed by the unetched part of the original metallized/holographic layer and partly formed by means of one or more polymeric colors (e.g. a picture of a house that has been printed so that the roof is in red, the walls are formed of the holographic material and the windows are in yellow). The preferred coloring overlay materials 32 are preferably homo or co-polymers based on monomers, such as vinyl acetate or vinyl chloride, that are disposed over the surface at thickness corresponding to about 28 gr/$m^2$. These polymers are preferably thermofixed at about 45° C. through the use of hot air.

Finally, a finishing painting operation or lacquering (not shown) can be optionally performed utilizing a suitable lacquering composition. One preferred lacquer composition comprises about 86% by weight of a polyester polyurethane thermoplastic, about 13% by weight of vinyl chloride and about 1% by weight of vinyl acetate in a carrier that suitably comprises a mixture of methyl ethyl ketone (MEK), dimethyl formamide (DMF) and isopropylene. As a result, the printed material is transferable to various desired preformed plastic supports or carriers. The final product will comprise the carrier and the transferred multiple layer film structure of this invention which, when being seen from the outside, i.e. in an upward direction from the bottom (that is first through the supporting structure 16) of the structure depicted in FIG. 6, will show a holographic region, i.e. the remaining portions 34 of the metal holographic layer 12, and a printed color indicia (text/image/character) region, i.e. the channels 24 and the coloring materials 32 in the background. Optionally, one or more of the layers of the final product, e.g. the added substrate film 16, may be peeled off prior to use.

According to the present invention, it should be noted that the use of the etching resistant material 20 to mask selective portions of the metal holographic layer 12 from the etchant 22 effectively prevents any damage to the metal holographic layer 12 outside of the intended etched portion, thereby providing a perfectly defined image with a printed size as small as about 1 mm. After the step of removing the debris, the reinforcement processing, performed by depositing the reinforcing overlay material 28, provides the product with great strength, allowing it to easily resist damage as a consequence of further possible processing or use operations. The final processing, utilizing the disclosed lacquering material in an appropriate solution, will allow proper transfer of the printed material to any desired types of plastic preformed supports or carriers.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A method of forming a holographic film containing indicia thereon comprising:

(a) printing a copolymeric primer, in a predetermined pattern corresponding to a positive of the indicia to be applied to the holographic film, on a preformed holographic film, wherein the primer is resistant to etching, (b) depositing an activated etching substance on top of at least one unprimed portion of the surface of the holographic film.

(c) subjecting the primer coated film to etching conditions whereby causing the at least one unprimed portion of the film not covered by the primer to be etched away, and forming a crystallized material debris disposed in the space vacated by said etching and at least partially on said holographic film, (d) removing the so formed crystallized material debris, and (e) drying the etched holographic film.

2. The method claimed in claim 1 wherein said film comprises a metallized holographic film comprising a metal layer and a polymeric substrate.

3. The method as claimed in claim 2 wherein said polymeric substrate comprises a polyester polymer.

4. The method as claimed in claim 2 wherein said metallized holographic film further comprises an additional supporting film adhered to said polymeric substrate on a side thereof opposite to the side thereof that is adhered to said metal.

5. The method as claimed in claim 1 wherein said primer comprises a vinyl chloride-vinyl acetate copolymer.

6. The method as claimed in claim 1 further comprising, after removing said debris, disposing a reinforcing layer of polymeric material over said primer and said etched portions of said holographic film.

7. The method as claimed in claim 1 wherein said etchant comprises a basic material that reacts with said holographic layer but does not substantially react with said primer.

8. The method as claimed in claim 7 wherein said etchant comprises sodium hydroxide disposed in an aqueous solution of sodium chloride.

9. The method as claimed in claim 8 wherein said etchant further comprises at least one basic carboxylic fatty acid in an amount sufficient to activate said sodium hydroxide into an etching condition.

10. The method as claimed in claim 1 further comprising an additional step of disposing a further protective polymeric layer over said printed primer layer and said etched holographic film layer.

11. The method as claimed in claim 1 further comprising an additional step of printing polymeric colors over said printed primer layer and said etched holographic film layer, so as to form together with the latter a composite complex image or text.

12. A method of forming a metalized film containing indicia thereon comprising:

(a) printing a copolymeric primer, in a predetermined pattern corresponding to a positive of the indicia to be applied to the metalized film, on a preformed metalized film, wherein the primer is resistant to etching, (b) depositing an activated etching substance on top of at least one unprimed portion of the surface of the metalized film.

(c) subjecting the primer coated film to etching conditions whereby causing the at least one unprimed portion of the film not covered by the primer to be etched away, and forming a crystallized material debris disposed in the space vacated by said etching and at least partially on said metalized film, (d) removing the so formed crystallized material debris, and (e) drying the etched holographic film.

13. The method as claimed in claim 12 wherein said primer comprises a vinyl chloride-vinyl acetate copolymer.

14. The method as claimed in claim 12 further comprising, after removing said debris, disposing a reinforcing layer of polymeric material over said primer and said etched portions of said metalized film.

15. The method as claimed in claim 12 wherein said etchant comprises a basic material that reacts with said metalized layer but does not substantially react with said primer.

16. The method as claimed in claim 15 wherein said etchant comprises sodium hydroxide disposed in a aqueous solution of sodium chloride.

17. The method as claimed in claim 16 wherein said etchant further comprises at least one basic carboxylic fatty acid in an amount sufficient to activate said sodium hydroxide into an etching condition.

18. The method as claimed in claim 12 further comprising an additional step of disposing a further protective polymeric layer over said printed primer layer and said etched metalized film layer.

19. The method as claimed in claim 12 further comprising an additional step of printing polymeric colors over said printed primer layer and said etched metalized film layer, so as to form, together with the latter, a composite complex image or text.

* * * * *